United States Patent [19]

Hein et al.

[11] Patent Number: 5,785,462
[45] Date of Patent: Jul. 28, 1998

[54] ANCHORING CARTRIDGE FOR HARDENING MULTI-COMPONENT COMPOSITION

[75] Inventors: Bernd Hein, Freudenstadt; Willi Haug, Freudenstadt-Musbach, both of Germany

[73] Assignee: Fischerwerke Artur Fischer GmbH & Co., KG, Waldachtal, Germany

[21] Appl. No.: 645,480

[22] Filed: May 13, 1996

[51] Int. Cl.⁶ .................................................. E21D 20/02
[52] U.S. Cl. .................................. 405/259.6; 206/219
[58] Field of Search ........................ 405/259.6; 52/704; 206/219, 220

[56] References Cited

U.S. PATENT DOCUMENTS

| | | | |
|---|---|---|---|
| 2,982,396 | 5/1961 | Shihadeh | 206/219 X |
| 3,108,443 | 10/1963 | Schuermann et al. | 405/259.6 |
| 3,702,060 | 11/1972 | Cumming | 405/259.6 |
| 4,167,359 | 9/1979 | Beveridge | 405/259.6 X |
| 4,341,301 | 7/1982 | Meyer et al. | 206/219 |
| 4,651,875 | 3/1987 | Lang et al. | 405/259.6 X |
| 4,706,806 | 11/1987 | Mauthe | 405/259.6 X |
| 4,729,696 | 3/1988 | Goto et al. | 405/259.6 |
| 4,787,186 | 11/1988 | Irnscher et al. | 52/698 X |
| 4,894,269 | 1/1990 | Kimura | 405/259.6 X |
| 5,098,228 | 3/1992 | Mauthe . | |

*Primary Examiner*—Dennis L. Taylor
*Attorney, Agent, or Firm*—Michael J. Striker

[57] ABSTRACT

An anchoring cartridge for a hardening multi-component composition on the basis of a resin hardening by the reaction of radicals has an inner cartridge element containing the resin component and fillers and an outer cartridge element containing the hardener component. To allow the anchoring rod to be put in position by hand by driving the anchoring rod in fully, without spurting out or running out occurring during the operation of putting the rod in position, and to enable fillers to be used in both components to increase the strength, the inside width of the annular space between the inner and outer cartridge elements corresponds at least to the wall thickness of a cartridge element. Further, the resin contains a thixotropic agent which increases the viscosity of the resin to such an extent that the filler parts are suspended in the resin. The hardener component, which is present with liquid and optionally fillers and a thixotropic agent as a pasty mixture, completely fills the annular space between the inner and outer cartridge elements.

14 Claims, 1 Drawing Sheet

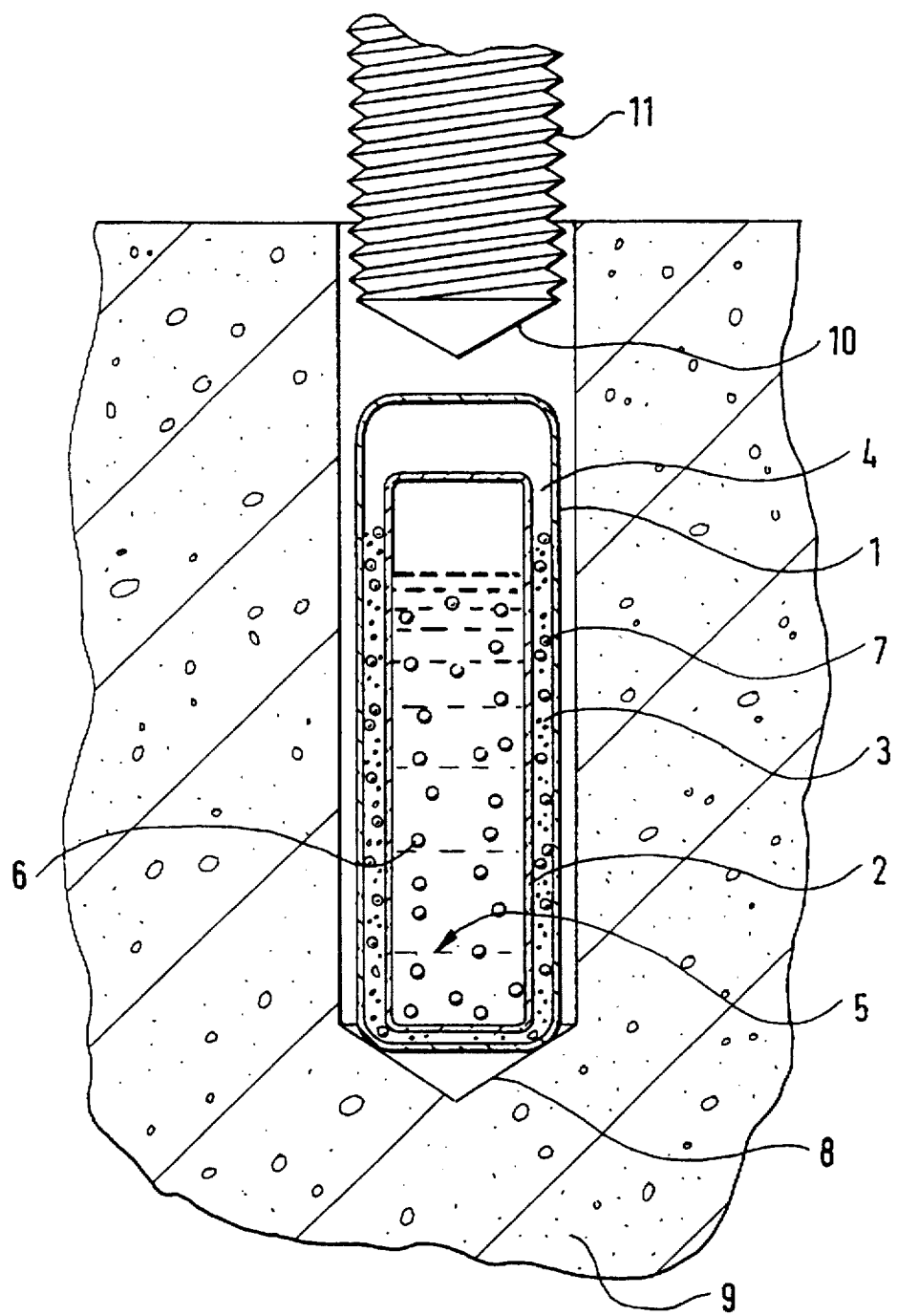

2

ANCHORING CARTRIDGE FOR HARDENING MULTI-COMPONENT COMPOSITION

BACKGROUND OF THE INVENTION

The present invention relates to an anchoring cartridge for a hardening multi-component composition on the basis of a resin hardening by the reaction of radicals (e.g. polyester resin, vinylester resin or (meth)acrylate resin).

An anchoring cartridge of the type mentioned in the preamble, the inner cartridge element of which contains the resin component and the outer cartridge element of which contains the hardener component, is known from DE-OS 38 06 598. To form and fix an annular space between the inner cartridge element and the outer cartridge element, a quartz sand coated with benzoyl peroxide hardener is used. The different grain sizes of the filler in the annular space between the two cartridges, filler of finer grain being located in the leading region and filler of coarser grain being located in the rear region, make it difficult to drive an anchoring rod into a drilled hole, especially by hand. The different grains and the resulting coatable surfaces of different sizes furthermore produce differences in concentration in the hardener component in the annular region, so that the hardening process progresses unevenly.

To avoid those disadvantages, in the Upat UES steel rod anchoring it is proposed to fix the inner cartridge element in the outer cartridge element by means of a mixture of a peroxide hardener and a polymer filler. But this mixture, which is in the form of a powder, necessitates a very small annular space to avoid settling of the hardener component in the annular region between the inner and outer cartridge elements. Moreover, this powder has only a slight cleaning effect on the wall of the drilled hole, so that drilling dust clinging to the wall of the drilled hole reduces the bond strength. To compensate for that, the viscosity of the resin component with which the inner cartridge element is filled is adjusted to be very low, to achieve a good wetting of the wall of the drilled hole. The drawback of that construction, however, is that the low-viscosity resin spurts out of the drilled hole or, in the case of wall mounting, runs out, when the anchoring rod is put in position by hammering. Furthermore, it is not possible to use fillers in the resin, since they would settle in the cartridge on account of their higher density. In particular in the case of floor mountings, the filler that had settled at the bottom of the cartridge would make it very difficult to drive the anchoring rod in fully.

SUMMARY OF THE INVENTION

Accordingly, it is an object of the present invention to provide an anchoring cartridge for a hardening multi-component composition, which avoids the disadvantages of the prior art.

In keeping with these objects and with others which will become apparent hereinafter, one feature of the present invention resides, briefly stated, in an anchoring cartridge for a hardening multi-component composition on the basis of a resin hardening by a reaction of radicals, with an inner cartridge element containing a resin component with fillers and an annular space between the inner cartridge element and an outer cartridge element containing a hardener component, and both components being activated by driving an anchoring rod into a hole drilled in a building component receiving the anchoring cartridge, wherein in accordance with the present invention an inside width of the annular space corresponds at least to a wall thickness of a cartridge and at most to 5% of an external diameter of the outer cartridge element, the resin contains a thixotropic agent which increases the viscosity of the resin to such an extent that the filler parts are suspended in the resin, and the hardener component is present with a liquid and, optionally, fillers and a thixotropic agent as a pasty mixture which completely seals the annular space between the inner and outer cartridge elements.

When the anchoring cartridge for a hardening multi-component composition is designed in accordance with the present invention, it is possible to put the anchoring rod into position by hand by driving it in fully, without spurting out or running out occurring during the operation of putting the anchoring rod into position, and to use fullers in both components to increase the strength.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing an anchoring cartridge for a hardening multi-component composition.

DESCRIPTION OF PREFERRED EMBODIMENTS

The glass anchoring cartridge for a hardening multi-component composition on the basis of a resin hardening by the reaction of radicals (e.g. polyester resin, vinylester resin or (meth)acrylate resin) consists of an outer cartridge element 1 and, lying inside the outer cartridge element, an inner cartridge element 2, which is centered, by the hardener component 3 with which the outer cartridge element 1 is filled, to form an annular space 4. The inner cartridge element 2 is filled with the resin component 5 with fillers 6. The hardener component present in the form of a pasty mixture can also contain fillers, for example, glass beads 7.

The anchoring cartridge is inserted in a hole 8 drilled in a building component 9. By driving in the anchoring rod 11 provided with a wedge-shaped tip 10, the anchoring cartridge is crushed and the components contained in the anchoring cartridge are activated. To reduce the energy required for driving in, in particular when putting the anchoring rod in position by hand using a hand hammer, the external diameter of the anchoring rod 11 is somewhat smaller than the external diameter of the outer cartridge element 1. Further, the wall thickness of the cartridge is 0.3–0.5 mm, and the inside width of the annular space 4 corresponds at least to the wall thickness of a cartridge and at most to 5% of the external diameter of the outer cartridge element.

By virtue of an annular space corresponding at least to the wall thickness of a cartridge and at most to 5% of the external diameter of the outer cartridge element, both cartridges are relatively easy to crush and an advantageous ratio of volumes between the resin and hardener components for good blending is achieved. Furthermore, it is possible for fillers having a grain size corresponding at most to the wall thickness of the glass cartridges to be incorporated in both components. The volume proportion of the hardener component is increased by mixing the hardener component with a liquid, for example, water or an organic solvent, and a suitable thixotropic agent and, optionally, fillers, to form a paste which completely fills the annular space between the inner and outer cartridge elements. The high viscosity of the paste prevents settling even in a relatively large annular region and enables a uniform distribution of the hardener component over the entire length of the cartridge to be achieved.

Further, a thixotropic agent increases the viscosity of the resin to such an extent that settling phenomena of the fillers are avoided. Increasing the viscosity of the resin at the same time prevents running out and spurting out occurring during the positioning operation. The uniform distribution of the two components in the anchoring cartridge, combined with the additional fillers in the resin component, and optionally also in the hardener component, ensures a uniform, complete hardening of the composition, high strength of the hardened synthetic resin mortar and good bond strength between synthetic resin mortar and the wall of the drilled hole.

A reactive mineral bonding agent on a cement basis has proved to be an especially advantageous filler in the resin component. In that case, it is advantageous to use a pyrogenic silicic acid as the thixotropic agent in the resin component. The hardener component has glass beads as filler and a hydrophobic pyrogenic silicic acid as thixotropic agent. The mineral bonding agent promotes the flow of the resin-hardener mixture, as the fluid, for example, water, incorporated in the hardener component combines with the mineral bonding agent. The resin-hardener mixture therefore becomes more liquid. Pyrogenic silicic acids, when used as thixotropic agents, have the property that as the anchoring rod is driven in and the shearing forces occurring in that operation act on the mixture, the viscosity of both the resin component and the hardener component is reduced. Blending of the two components is thus promoted and at the same time driving in of the anchoring rod is facilitated. The glass beads incorporated in the paste-like hardener component on the one hand increase the compressive strength of the multi-component composition after it has hardened, and on the other hand enable a centering effect to be achieved for a uniform annular space between the inner and outer cartridge elements.

Steel balls can also be used as filler in the resin component. In that case, pyrogenic silicic acid is used as thixotropic agent both in the resin component and in the hardener component and decahydro-naphthalene (decalin) is used as liquid in the hardener component.

The diameter of the steel balls, made of stainless steel, is 10–50 μm, preferably 22 μm. This on the one hand ensures satisfactory flowability of the mixture to reduce the energy required for driving in the anchoring rod and on the other hand avoids settling phenomena.

The hardener mixture consists of a pasty mixture of decahydro-naphthalene (decalin) with hardener. A large-surface intermingling of resin and hardener is consequently ensured. The pyrogenic silicic acids prevent separation of the hardener from the decahydro-naphthalene (decalin). As the hardener component is blended with the resin component, the decahydro-naphthalene (decalin) separates so that the reaction takes place only between resin and hardener.

To achieve a comminution of the glass cartridge into particles that are as small as possible, it is advantageous for the external diameter of the outer cartridge element to be the same as or smaller than the external diameter of the anchoring rod.

For satisfactory strength of the hardened multi-component composition, the total amount of additives, including the glass particles of the anchoring cartridge, should be 2 to 3.5 times the resin composition. By virtue of the additives already contained in the resin component and hardener component, the wall thickness of the cartridge elements can be restricted to 0.3 to 0.5 mm. The energy required for driving in the anchoring rod is consequently also reduced.

Two embodiments of an anchoring cartridge according to the invention for an M16 anchoring rod are described below.

| | |
|---|---|
| length of outer cartridge element: | 105 mm |
| diameter of outer cartridge element: | 15.5 mm |
| length of inner cartridge element: | 90 mm |
| diameter of inner cartridge element: | 12.5 mm |
| wall thickness of inner and outer cartridge elements | 0.4 mm |
| Contents of first embodiment: | |
| Inner cartridge element | |
| vinyl ester resin | 6.5 g |
| mineral bonding agent | 3.7 g |
| hydrophobic pyrogenic silicic acid | 0.30 g |
| Outer cartridge element | |
| hardener | 0.53 g |
| (peroxide with 50% proportion of hardener/50% inert additive) | |
| glass beads | 1.1 g |
| pyrogenic silicic acid | 0.08 g |
| water | 1.4 g |
| Contents of second embodiment: | |
| Inner cartridge element | |
| vinyl ester resin | 6.5 g |
| steel balls (φ 22 μm) | 11.6 g |
| pyrogenic silicic acid | 0.25 g |
| Outer cartridge element | |
| hardener | 0.53 g |
| (50% peroxide/50% inert additive) | |
| decahydro-naphthalene (decalin) | 2.14 g |
| pyrogenic silicic acid | 0.18 g |
| Positioning operation: | |
| diameter of drilled hole: | 18 mm |
| length of drilled hole: | 150 mm |
| driven in with hand hammer using 800 g blows: | 18 |
| withdrawal value (kN) | 100 |

It will be understood that each of the elements described above, or two or more together, may also find a useful application in other types of constructions differing from the types described above.

While the invention has been illustrated and described as embodied in an anchoring cartridge for hardening multi-component composition, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchoring cartridge for a hardening multi-component composition based on a resin hardening by a reaction of radicals, the cartridge comprising an inner cartridge element; an outer cartridge element forming with said inner cartridge element an annular space, said inner cartridge element containing a resin component with fillers, said annular space between said inner cartridge element and said outer cartridge element containing a hardener component, both said components being activatable by driving an anchoring rod into a hole drilled in a building component receiving the anchoring cartridge, said resin containing a thixotropic agent which increases a viscosity of said resin to such an extent that filler parts are suspended in said resin, said hardner component being present with a liquid and a thixotropic agent as a pasty mixture which completely fills said annular space between said inner and outer cartridge elements, proportions by weight of said resin component related to a content of said inner cartridge element being

| | | |
|---|---|---|
| a) | resin | 60–64% by weight |
| b) | mineral bonding agent | 34–37% by weight |
| c) | hydrophobic pyrogenic silic acid and proportions by weight of said hardener component related to a content of said cartridge element are | 2–3% by weight |
| d) | hardener (50% hardener proportion/50inert additive) | 16–18% by weight |
| e) | glass beads | 32–38% by weight |
| f) | pyrogenic silic acid | 2–3% by weight |
| g) | water | 42–48% by weight |

2. An anchoring cartridge as defined in claim 1, wherein said hardener component is present with the liquid, the thixotropic agent and additionally a filler.

3. An anchoring cartridge as defined in claim 1, wherein said filler and said resin component is a reactive mineral bonding agent and said thixotropic agent is a hydrophobic pyrogenic silicic acid, said filler and said hardener component including glass beads, said thixotropic agent being a pyrogenic silicic acid, and said liquid being water.

4. An anchoring cartridge as defined in claim 1, wherein said filler and said resin component comprises steel balls, said thixotropic agent in said resin component and in said hardener component being pyrogenic silicic acid, said liquid in said hardener component being decahydro-naphthalene.

5. An anchoring cartridge as defined in claim 1; and further comprising an anchoring rod, said outer cartridge element having an external diameter which is identical to an external diameter of said anchoring rod.

6. An anchoring cartridge as defined in claim 1; and further comprising an anchoring rod, said outer cartridge element having an external diameter which is smaller than an external diameter of said anchoring rod.

7. An anchoring cartridge as defined in claim 1, wherein each of said cartridge elements has a wall thickness between 0.3 and 0.5 mm.

8. An anchoring cartridge for a hardening multi-component composition based on a resin hardening by a reaction of radicals, the cartridge comprising an inner cartridge element; an outer cartridge element forming with said inner cartridge element an annular space, said inner cartridge element containing a resin component with fillers, said annular space between said inner cartridge element and said outer cartridge element containing a hardener component, both said components being activatable by driving an anchoring rod into a hole drilled in a building component receiving the anchoring cartridge, said resin containing a thixotropic agent which increases a viscosity of said resin to such an extent that filler parts are suspended in said resin, said hardner component being present with a liquid and a thixotropic agent as a pasty mixture which completely fills said annular space between said inner and outer cartridge elements, proportions by weight of said resin component related to a content of said inner cartridge element being

| | | |
|---|---|---|
| a) | resin | 30–36% by weight |
| b) | stainless steel balls having a diameter of 10–50 μm | 60–66% by weight |
| c) | pyrogenic silicic acid and proportions by weight of said hardener component related to a content of said outer cartridge element are | 1–1.5% by weight |
| d) | hardener (50% hardener proportion/ 50% inert additive) | 17–19% by weight |
| e) | decahydro-naphthalene | 71–80% by weight |
| f) | pyrogenic silicic acid | 5–8% by weight |

9. An anchoring cartridge as defined in claim 8, wherein said hardener component is present with the liquid, the thixotropic agent and additionally a filler.

10. An anchoring cartridge as defined in claim 8, wherein said filler and said resin component is a reactive mineral bonding agent and said thixotropic agent is a hydrophobic pyrogenic silicic acid, said filler and said hardener component including glass beads, said thixotropic agent being a pyrogenic silicic acid, and said liquid being water.

11. An anchoring cartridge as defined in claim 8, wherein said filler and said resin component comprises steel balls, said thixotropic agent in said resin component and in said hardener component being pyrogenic silicic acid, said liquid in said hardener component being decahydronaphthalene.

12. An anchoring cartridge as defined in claim 8; and further comprising an anchoring rod, said outer cartridge element having an external diameter which is identical to an external diameter of said anchoring rod.

13. An anchoring cartridge as defined in claim 8; and further comprising an anchoring rod, said outer cartridge element having an external diameter which is smaller than an external diameter of said anchoring rod.

14. An anchoring cartridge as defined in claim 8, wherein each of said cartridge elements has a wall thickness between 0.3 and 0.5 mm.

* * * * *